US006412742B1

(12) United States Patent
Yu

(10) Patent No.: US 6,412,742 B1
(45) Date of Patent: Jul. 2, 2002

(54) GUITAR STAND

(76) Inventor: Ming-Ti Yu, 122-5, Jun Liao Rd., Feng Yuan, Taichung Hsien (TW)

( * ) Notice: Subject to any disclaimer, the term of this patent is extended or adjusted under 35 U.S.C. 154(b) by 5days.

(21) Appl. No.: 09/761,129

(22) Filed: Jan. 11, 2001

(51) Int. Cl.[7] .......... F16M 11/38

(52) U.S. Cl. .......... 248/434; 248/166; 84/327; 403/87; 403/119

(58) Field of Search .......... 248/166, 176.1, 248/164, 165, 167, 170, 434, 173, 168, 188.6, 188.7, 188.8, 371, 163.1, 431; 403/87, 84, 119; 84/453, 327, 387 A, 329, 280

(56) References Cited

U.S. PATENT DOCUMENTS 5,350,143 A * 9/1994 Hoshino .......... 248/166
5,375,497 A * 12/1994 Pirchio et al. .......... 84/327
5,383,634 A * 1/1995 Liao .......... 248/166
5,505,413 A * 4/1996 Hennessey .......... 248/166
5,664,756 A * 9/1997 Liao .......... 248/443
5,713,547 A * 2/1998 Yu .......... 248/166
5,744,735 A * 4/1998 Liao .......... 84/327
5,836,552 A * 11/1998 Yu .......... 248/166
5,957,417 A * 9/1999 Yu .......... 248/166
6,036,159 A * 3/2000 Yu .......... 248/443
6,113,040 A * 9/2000 Yu .......... 248/166

* cited by examiner

*Primary Examiner*—Kimberly T. Wood

(57) ABSTRACT

A guitar stand has a rear support frame, a first front leg, a second front leg, an adjusting seat, an upper block connected to the rear support frame, the adjusting seat connected to the upper block, the first front leg and the second front leg, a first bracket disposed on the first front leg, and a second bracket disposed on the second front leg.

3 Claims, 8 Drawing Sheets

GUITAR STAND

BACKGROUND OF THE INVENTION

The invention relates to a guitar stand. More particularly, the invention relates to a guitar stand which can be folded easily.

U.S. Pat. No. 5,713,547 has disclosed a guitar stand which has a main hollow rod, a first hollow leg,a second hollow leg, a first brace, a second brace, a first bracket, and a second bracket. A pivot means fastens the first hollow leg and the second hollow leg on the main hollow rod pivotally. A hollow upper block is disposed on top of the main hollow rod. The pivot means has a lobe, a transverse plate and a longitudinal plate which is disposed on top of the transverse plate. A main hollow rod has a lobe disposed on an upper portion of the main hollow rod. A circular hole and a curved hole are formed on the main hollow rod. A hollow upper block has a lower protrusion inserted in an upper end of the main hollow rod. A first and a second round cushions are disposed adjacent to a first and a second sides of the hollow upper block, respectively. The first round cushion has a first center hole. The second round cushion has a second center hole. A first bolt passes through the first center hole to fasten the first round cushion on the hollow upper block. A second bolt passes through the second center hole to fasten the second round cushion on the hollow upper block. A longitudinal plate is disposed on a top of the transverse plate. The longitudinal plate has an upper hole to match the corresponding circular hole and a lower hole to match the corresponding curved hole. A first fastening member passes through the circular hole and the upper hole and a second fastening member passes through the lower hole and the curved hole to fasten the lobe and the longitudinal plate together. A first and a second joints are disposed on the first and the second hollow legs, respectively. Each of the first and the second joints has a threaded lower portion inserted in a top interior of the corresponding hollow leg, an annular flange abutting the threaded lower portion, and a top recess to receive the transverse plate. A bevel is disposed beneath the top recess. A notch is formed on a top rim of the first hollow leg. A third and a fourth fastening members fasten the first and the second joints on the transverse plate. The first brace is fastened on a lower portion of the first hollow leg. The second brace is fastened on a lower portion of the second hollow leg. A first hook extends from a top end of the first bracket to be inserted in the first brace. A second hook extends from a top end of the second bracket to be inserted in the second brace. However, the hollow leg will be detached from the respective joint if the user extends the hollow leg to the utmost.

SUMMARY OF THE INVENTION

An object of the present invention is to provide a guitar stand which can be folded easily.

Yet another object of the present invention is to provide a guitar stand which can stand stably.

Accordingly, a guitar stand comprises a rear support frame, a first front leg, a second front leg, an adjusting seat, an upper block connected to the rear support frame, the adjusting seat connected to the upper block, the first front leg and the second front leg, a first bracket disposed on the first front leg, and a second bracket disposed on the second front leg. The rear support frame has a main tube connected to the upper block, a first rear leg, a second rear leg, and a joint connected to the main tube, the first rear leg, and the second rear leg. The upper block has a lower connector having a U-shaped lug. The U-shaped lug has a hexagonal threaded hole. The lower connector receives the main tube. The joint has a U-shaped sleeve having a lower slot and a through hole, and an upper post disposed on the U-shaped sleeve for insertion in the main tube. The first rear leg has a first tube and a first upper connector disposed on the first rear leg. The first upper connector has a first upper notch, a first insertion slot, and a round hole communicating with the first insertion slot. The second rear leg has a second tube and a second upper connector disposed on the second rear leg. The second upper connector has a second upper notch, and a circular hole. The second upper connector is inserted in the first insertion slot of the first upper connector. The first upper connector is inserted in the lower slot of the U-shaped sleeve. A first rivet passes through the through hole of the U-shaped sleeve, the round hole of the first upper connector, and the circular hole of the second upper connector. The adjusting seat has a blocking plate, and a positioning plate connected to the blocking plate. The blocking plate has an upper pivot hole and a lower pivot hole. The positioning plate has a lower lug having a pivot aperture. The first front leg has a first pipe and a third upper connector disposed on the first pipe. The third upper connector has a third upper notch, a second insertion slot, and a round aperture communicating with the second insertion slot. The second front leg has a second pipe and a fourth upper connector disposed on the second pipe. The fourth upper connector has a fourth upper notch, and a circular aperture. The blocking plate is inserted in the U-shaped lug. A bolt passes through the hexagonal threaded hole of the U-shaped lug and the upper pivot hole of the blocking plate to fasten the U-shaped lug and the blocking plate together. The fourth upper connector is inserted in the second insertion slot of the third upper connector. The third upper connector is disposed between the blocking plate and the lower lug of the positioning plate. A second rivet passes through the pivot aperture of the positioning plate, the round aperture of the third upper connector, the circular aperture of the fourth upper connector, and the lower pivot hole of the blocking plate.

DETAILED DESCRIPTION OF THE INVENTION

Figure 1:
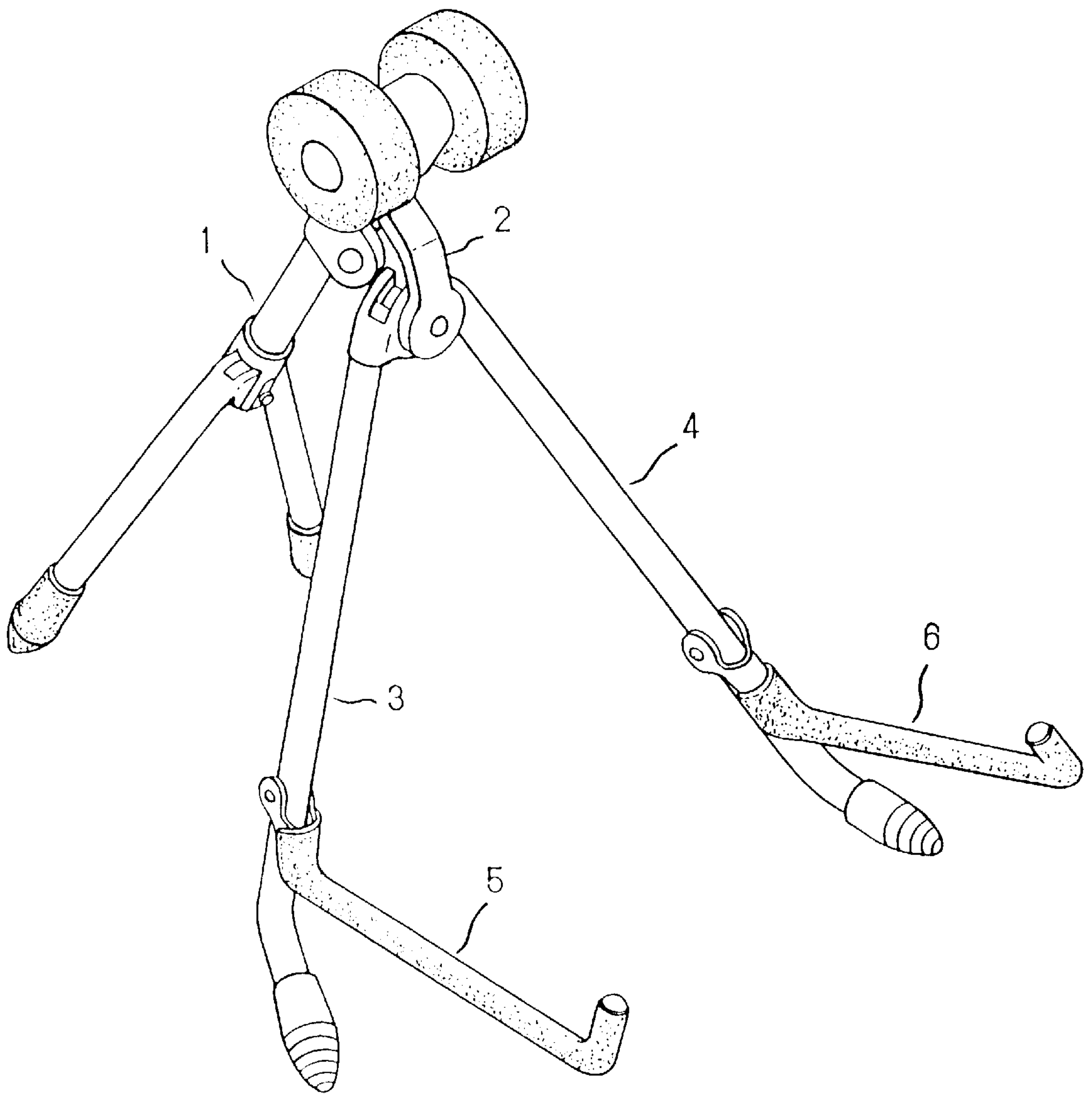
FIG. 1 is a perspective assembly view of a guitar stand of a preferred embodiment in accordance with the present invention.
Figure 2:
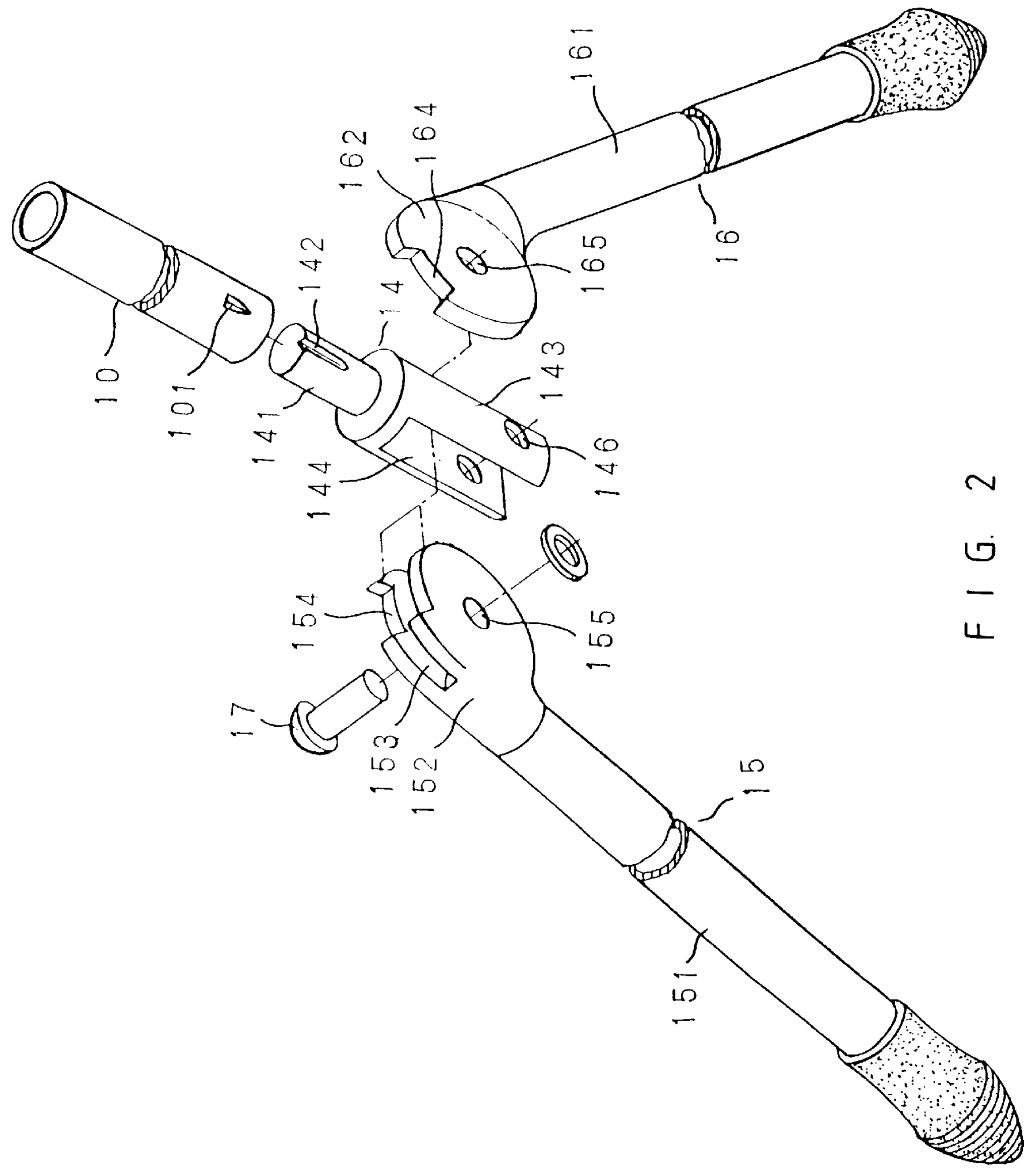
FIG. 2 is a perspective exploded view of a rear support frame of a preferred embodiment in accordance with the present invention.
Figure 3:
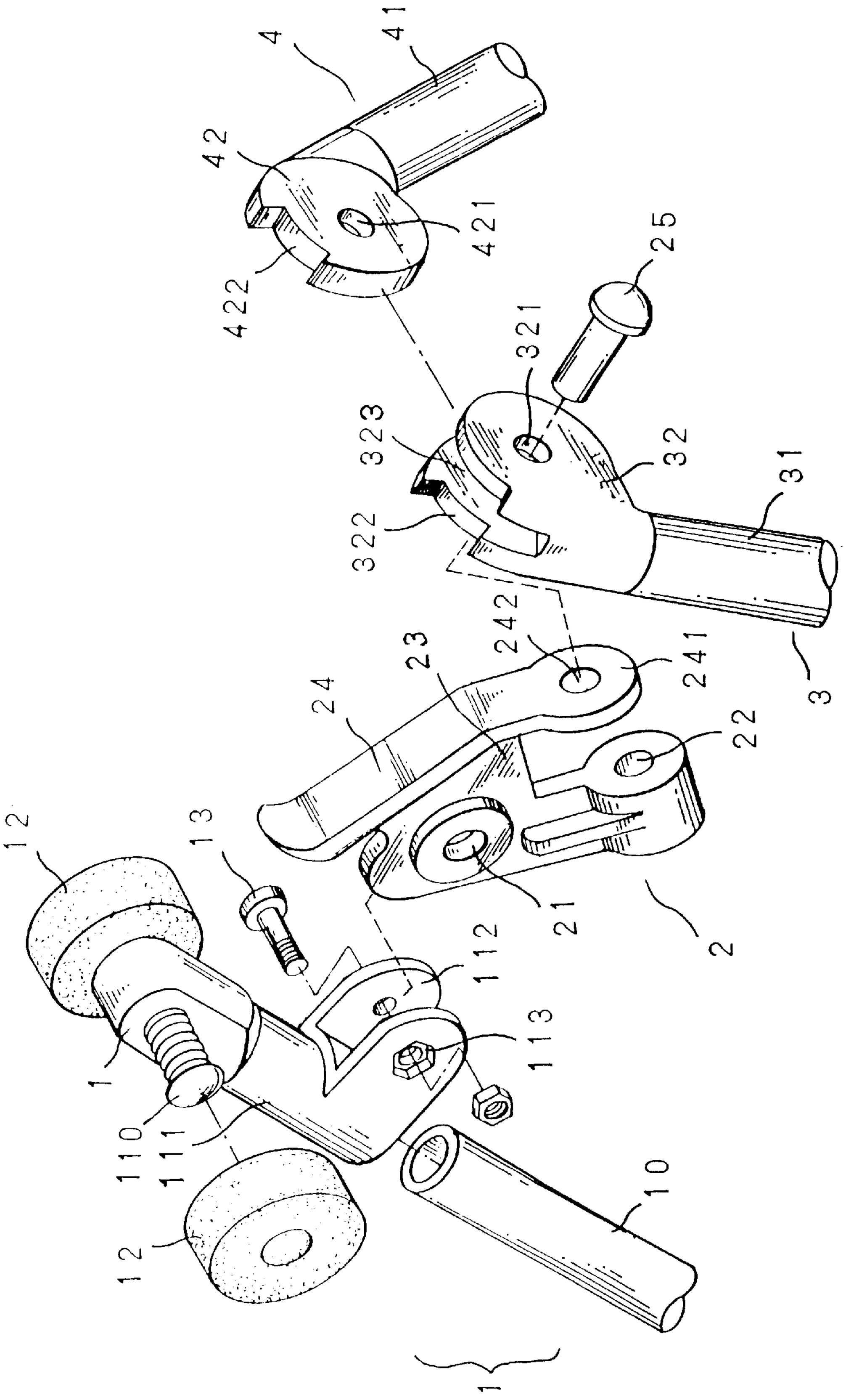
FIG. 3 is a perspective exploded view of a lower connector, an adjusting seat, a first front leg, and a second front leg of a preferred embodiment in accordance with the present invention.
Figure 4:
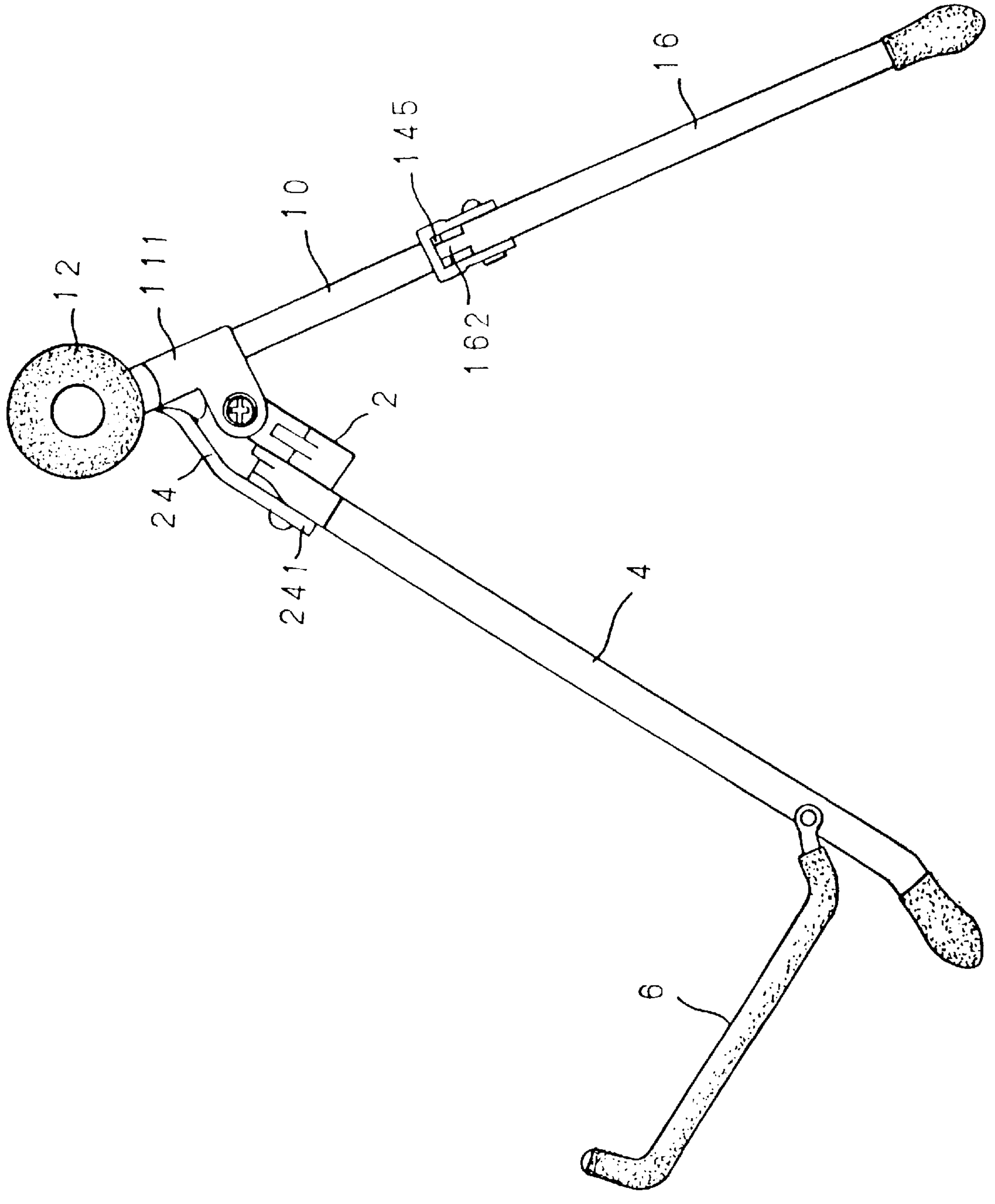
FIG. 4 is an elevational assembly view of a guitar stand of a preferred embodiment in accordance with the present invention.

Referring to FIGS. 1 to 8, a guitar stand comprises a rear support frame 1, a first front leg 3, a second front leg 4, an adjusting seat 2, an upper block 11 connected to the rear support frame 1, the adjusting seat 2 connected to the upper block 11, the first front leg 3 and the second front leg 4, a first bracket 5 disposed on the first front leg 3, and a second bracket 6 disposed on the second front leg 4.

The rear support frame 1 has a main tube 10 connected to the upper block 11, a first rear leg 15, a second rear leg 16, and a joint 14 connected to the main tube 10, the first rear leg 15, and the second rear leg 16.

The upper block 11 has a lower connector 111 having a U-shaped lug 112. The U-shaped lug 112 has a hexagonal threaded hole 113.

The main tube 10 has a lower triangular recess 101.

The lower connector 111 receives the main tube 10.

The joint 14 has a U-shaped sleeve 143 having a lower slot 144 and a through hole 146, and an upper post 141 disposed on the U-shaped sleeve 143 for insertion in the main tube 10.

The upper post 141 has a groove 142 for an engagement with the lower triangular recess 101 of the main tube 10.

An inner blocking protrusion 145 is disposed in the U-shaped sleeve 143.

The first rear leg 15 has a first tube 151 and a first upper connector 152 disposed on the first rear leg 15.

The first upper connector 152 has a first upper notch 154, a first insertion slot 153, and a round hole 155 communicating with the first insertion slot 153.

The second rear leg 16 has a second tube 161 and a second upper connector 162 disposed on the second rear leg 16.

The second upper connector 162 has a second upper notch 164, and a circular hole 165.

The second upper connector 162 is inserted in the first insertion slot 153 of the first upper connector 152.

The first upper connector 152 is inserted in the lower slot 144 of the U-shaped sleeve 143.

A first rivet 17 passes through the through hole 146 of the U-shaped sleeve 143, the round hole 155 of the first upper connector 152, and the circular hole 165 of the second upper connector 162.

The inner blocking protrusion 145 is inserted in the first upper notch 154 of the first upper connector 152 and the second upper notch 164 of the second upper connector 162.

The adjusting seat 2 has a blocking plate 23, and a positioning plate 24 connected to the blocking plate 23.

The blocking plate 23 has an upper pivot hole 21 and a lower pivot hole 22.

The positioning plate 24 has a lower lug 241 having a pivot aperture 242.

The first front leg 3 has a first pipe 31 and a third upper connector 32 disposed on the first pipe 31.

The third upper connector 32 has a third upper notch 322, a second insertion slot 323, and a round aperture 321 communicating with the second insertion slot 323.

The second front leg 4 has a second pipe 41 and a fourth upper connector 42 disposed on the second pipe 41.

The fourth upper connector 42 has a fourth upper notch 422, and a circular aperture 421.

The blocking plate 23 is inserted in the U-shaped lug 112.

A bolt 13 passes through the hexagonal threaded hole 113 of the U-shaped lug 112 and the upper pivot hole 21 of the blocking plate 23 to fasten the U-shaped lug 112 and the blocking plate 23 together.

The fourth upper connector 42 is inserted in the second insertion slot 323 of the third upper connector 32.

The third upper connector 32 is disposed between the blocking plate 23 and the lower lug 241 of the positioning plate 24.

A second rivet 25 passes through the pivot aperture 242 of the positioning plate 24, the round aperture 321 of the third upper connector 32, the circular aperture 421 of the fourth upper connector 42, and the lower pivot hole 22 of the blocking plate 23.

The upper block 11 further has two threaded columns 110. Two cushions 12 are disposed on the threaded columns 110.

Figure 5:
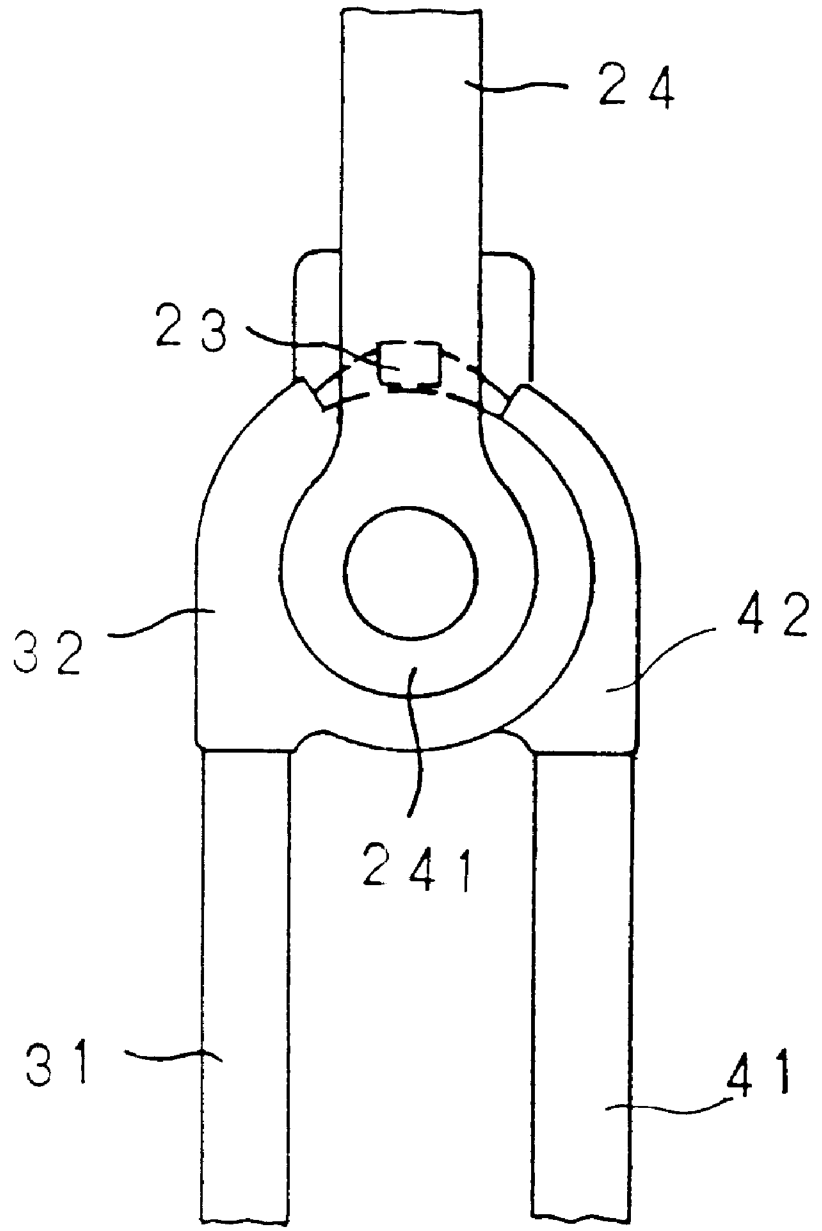
FIG. 5 is an elevational schematic view illustrating an engagement among an adjusting seat, a first front leg, and a second front leg of a preferred embodiment while the first front leg and the second front leg are folded.
Figure 6:
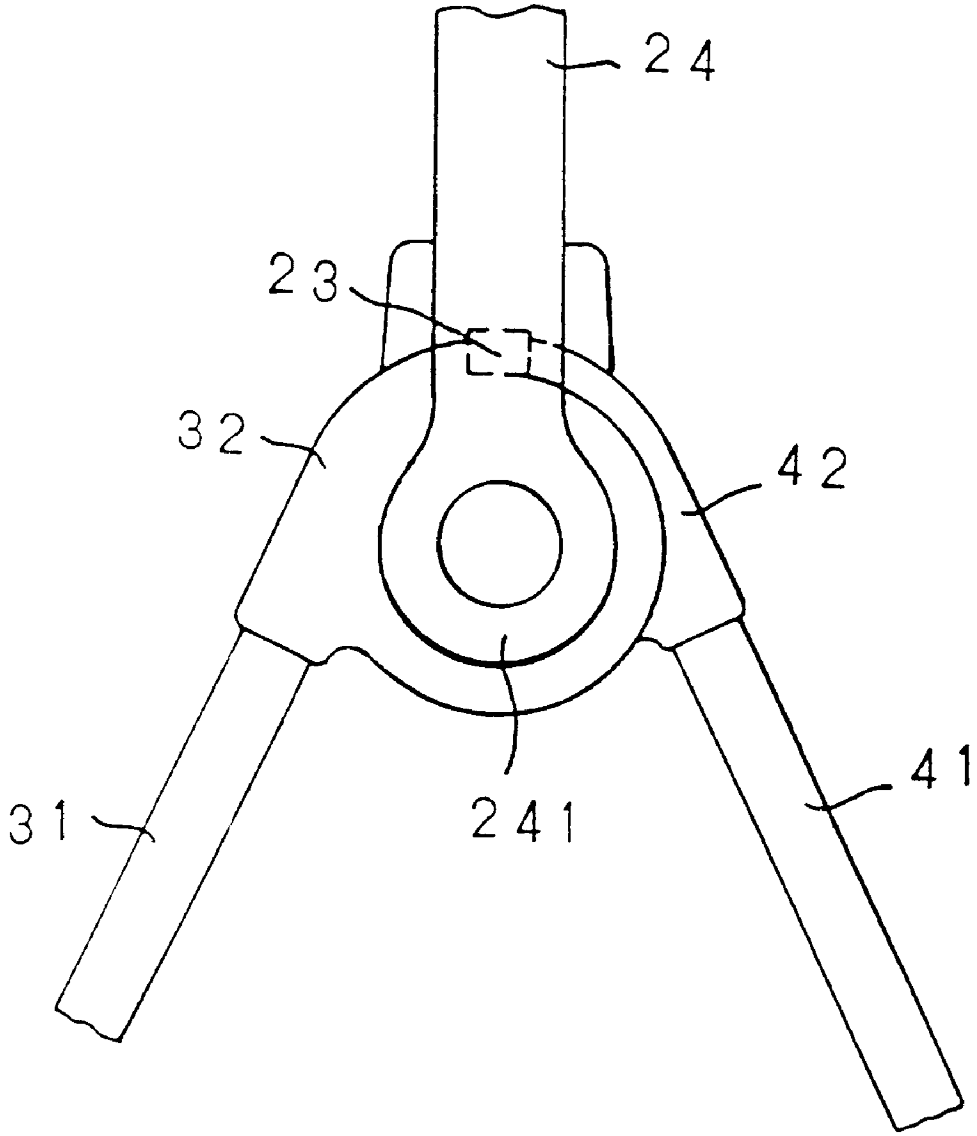
FIG. 6 is an elevational schematic view illustrating an engagement among an adjusting seat, a first front leg, and a second front leg of a preferred embodiment while the first front leg and the second front leg are extended.
Figure 7:
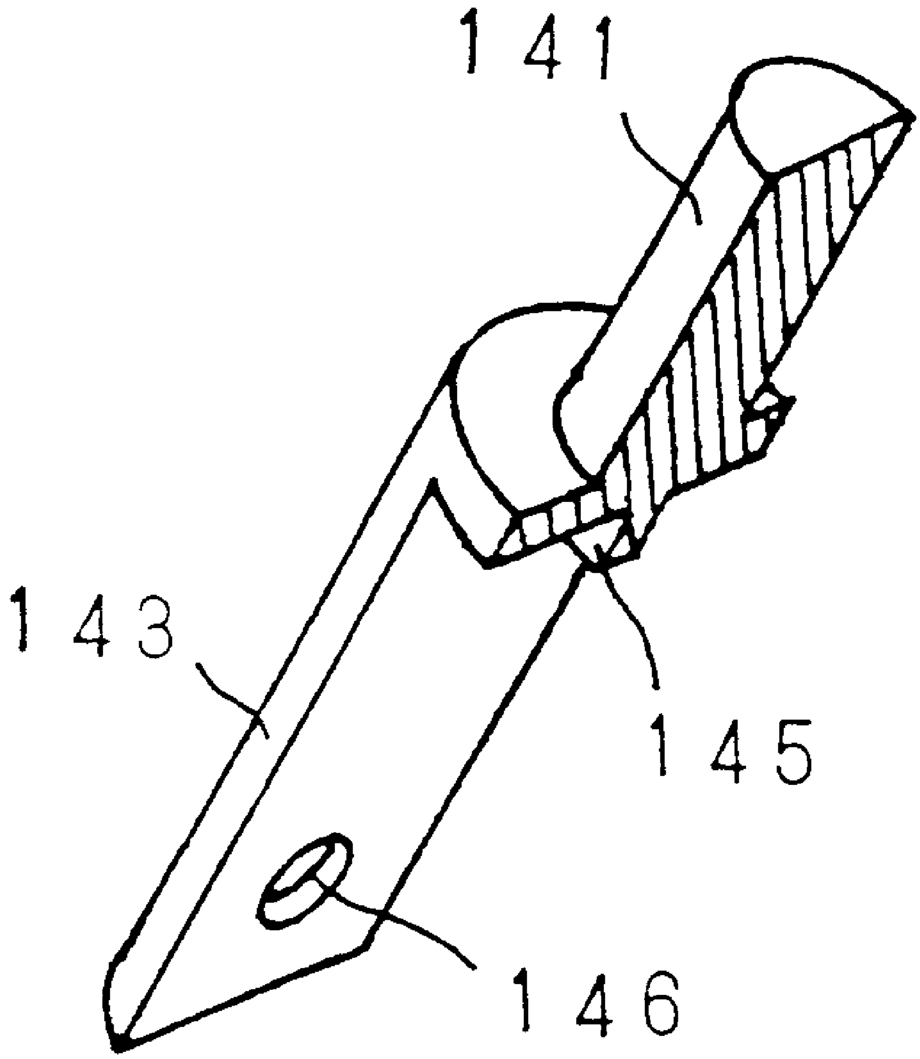
FIG. 7 is a partially sectional view of a joint of a preferred embodiment in accordance with the present invention.
Figure 8:
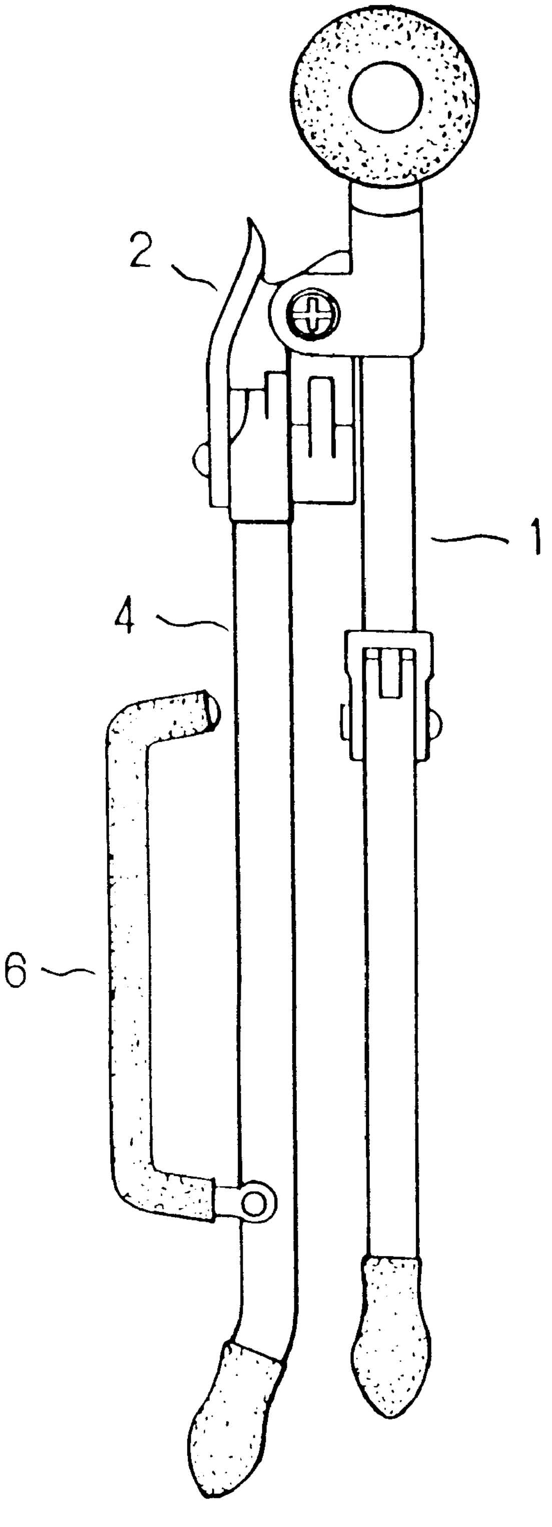
FIG. 8 is a schematic view illustrating a folding of a guitar stand of a preferred embodiment in accordance with the present invention.

Referring to FIGS. 5 and 8, the first pipe 31 and the second pipe 41 are folded. The first tube 151 and the second tube 161 are folded also.

The present invention is not limited to the above embodiment but various modification thereof may be made. Furthermore, various changes in form and detail may be made without departing from the scope of the present invention.

I claim:

1. A guitar stand comprises:

a rear support frame, a first front leg, a second front leg, an adjusting seat, an upper block connected to the rear support frame, the adjusting seat connected to the upper block, the first front leg and the second front leg, a first bracket disposed on the first front leg, and a second bracket disposed on the second front leg, the rear support frame having a main tube connected to the upper block, a first rear leg, a second rear leg, and a joint connected to the main tube, the first rear leg, and the second rear leg, the upper block having a lower connector having a U-shaped lug, the U-shaped lug having a hexagonal threaded hole, the lower connector receiving the main tube, the joint having a U-shaped sleeve having a lower slot and a through hole, and an upper post disposed on the U-shaped sleeve for insertion in the main tube, the first rear leg having a first tube and a first upper connector disposed on the first rear leg, the first upper connector having a first upper notch, a first insertion slot, and a round hole communicating with the first insertion slot, the second rear leg having a second tube and a second upper connector disposed on the second rear leg, the second upper connector having a second upper notch, and a circular hole, the second upper connector inserted in the first insertion slot of the first upper connector, the first upper connector inserted in the lower slot of the U-shaped sleeve, a first rivet passing through the through hole of the U-shaped sleeve, the round hole of the first upper connector, and the circular hole of the second upper connector, the adjusting seat having a blocking plate, and a positioning plate connected to the blocking plate, the blocking plate having an upper pivot hole and a lower pivot hole, the positioning plate having a lower lug having a pivot aperture, the first front leg having a first pipe and a third upper connector disposed on the first pipe, the third upper connector having a third upper notch, a second insertion slot, and a round aperture communicating with the second insertion slot, the second front leg having a second pipe and a fourth upper connector disposed on the second pipe, the fourth upper connector having a fourth upper notch, and a circular aperture, the blocking plate inserted in the U-shaped lug, a bolt passing through the hexagonal threaded hole of the U-shaped lug and the upper pivot hole of the blocking plate to fasten the U-shaped lug and the blocking plate together, the fourth upper connector inserted in the second insertion slot of the third upper connector, the third upper connector disposed between the blocking plate and the lower lug of the positioning plate, and a second rivet passing through the pivot aperture of the positioning plate, the round aperture of the third upper connector, the circular aperture of the fourth upper connector, and the lower pivot hole of the blocking plate.

2. The guitar stand as claimed in claim 1, wherein an inner blocking protrusion is disposed in the U-shaped sleeve, and the inner blocking protrusion is inserted in the first upper notch of the first upper connector and the second upper notch of the second upper connector.

3. The guitar stand as claimed in claim 1, wherein the upper block further has two threaded columns and two cushions are disposed on the threaded columns.

* * * * *